United States Patent [19]

Henry et al.

[11] Patent Number: 4,518,448

[45] Date of Patent: May 21, 1985

[54] CLOSURE ASSEMBLY AND METHOD OF USING IT

[75] Inventors: Rene H. Henry, Hasselt; Jean M. E. Nolf, Hamme-mille, both of Belgium

[73] Assignee: N. V. Raychem S.A., Belgium

[21] Appl. No.: 554,371

[22] Filed: Nov. 21, 1983

Related U.S. Application Data

[63] Continuation of Ser. No. 308,886, Oct. 5, 1981, abandoned.

[30] Foreign Application Priority Data

Oct. 9, 1980 [GB] United Kingdom ............... 8032538

[51] Int. Cl.³ .............................................. B32B 31/26
[52] U.S. Cl. ..................................... 156/86; 24/530; 138/158; 156/49; 156/52; 156/91; 174/92; 174/DIG. 8; 428/36
[58] Field of Search ............... 24/255 R, 256, 259 FS, 24/530; 138/156–158; 156/47, 49, 52, 86, 91; 174/92, DIG. 8; 428/36

[56] References Cited

U.S. PATENT DOCUMENTS

| | | | |
|---|---|---|---|
| 3,836,702 | 9/1974 | Plummer | 174/92 |
| 3,879,249 | 4/1975 | Filreis et al. | 156/49 X |
| 4,283,239 | 8/1981 | Corke et al. | 156/86 X |

FOREIGN PATENT DOCUMENTS

| | | |
|---|---|---|
| 2943371 | 5/1980 | Fed. Rep. of Germany . |
| 2199217 | 4/1974 | France . |
| 2250950 | 6/1975 | France . |
| 2278183 | 2/1976 | France . |
| 2312130 | 12/1976 | France . |
| 1155470 | 6/1969 | United Kingdom . |
| 1503259 | 3/1978 | United Kingdom . |
| 1506748 | 4/1978 | United Kingdom . |
| 1516036 | 6/1978 | United Kingdom . |
| 2040106 | 8/1980 | United Kingdom . |
| 2059873 | 4/1981 | United Kingdom . |
| 2069773 | 8/1981 | United Kingdom . |

*Primary Examiner*—Robert A. Dawson
*Attorney, Agent, or Firm*—Dennis E. Kovach; T. Gene Dillahunty; Herbert G. Burkard

[57] ABSTRACT

An assembly for enclosing a telecommunication cable splice comprising a wraparound sleeve having longitudinal edges which can be brought together and secured by for example a metal channel. A seal is made between these edges by an internal sealing member which bridges the abutting edges of the sleeve and is urged into contact with the sleeve by expansive urging means between the sealing member and underlying cable splice. The urging means is preferably a foam strip.

22 Claims, 6 Drawing Figures

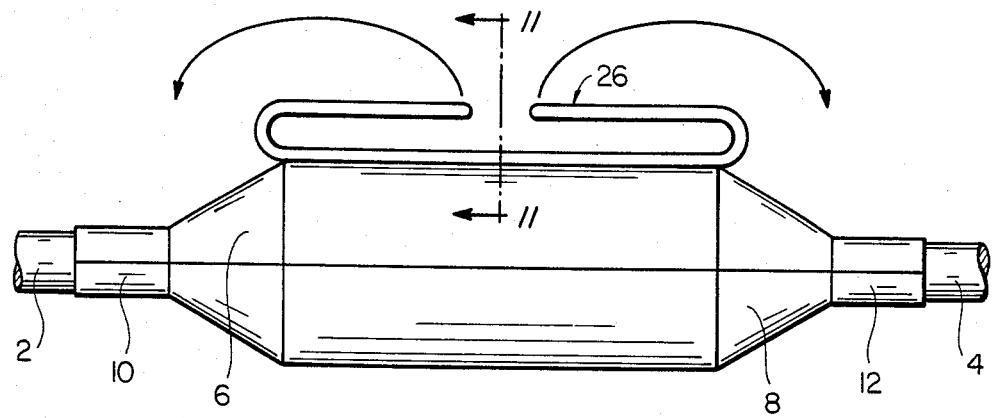
FIG_1
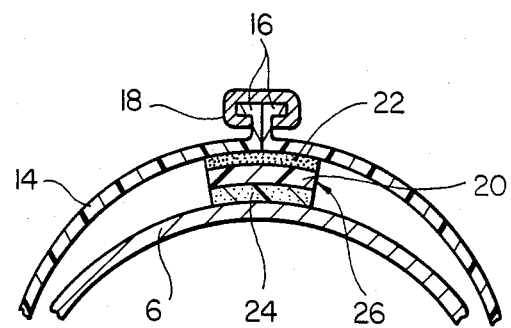
FIG_2

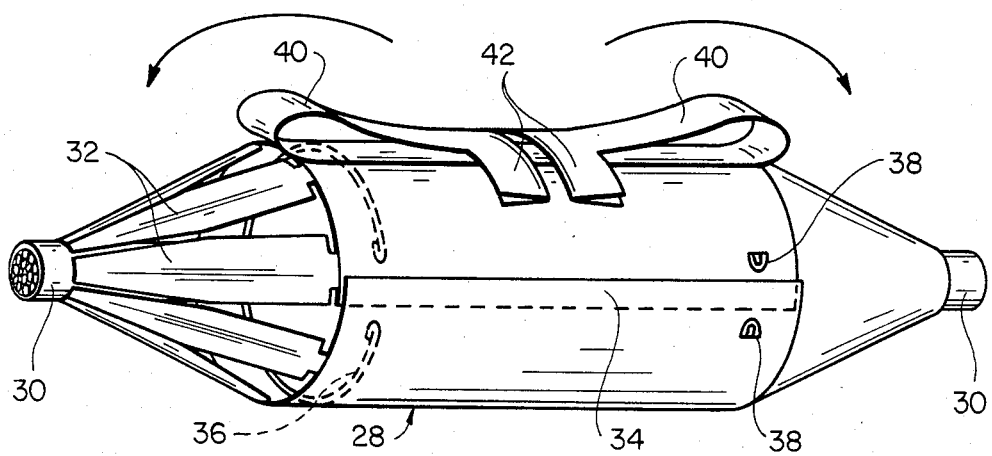
FIG_3
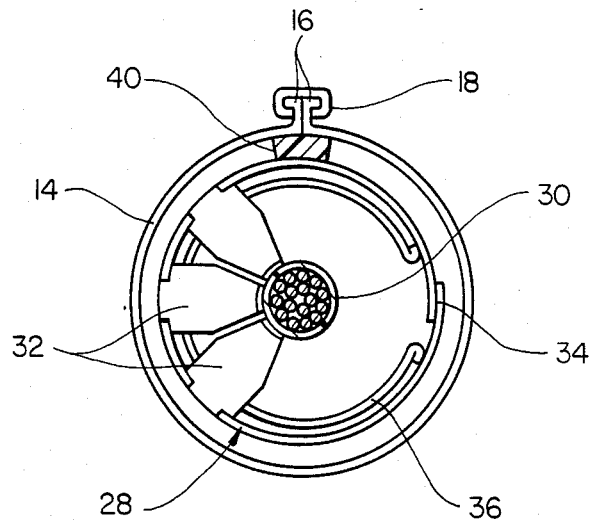
FIG_4

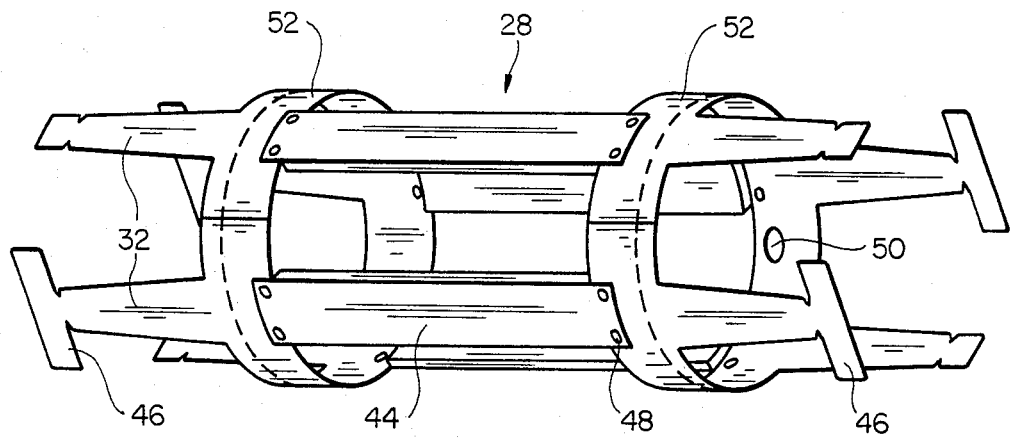
FIG_5
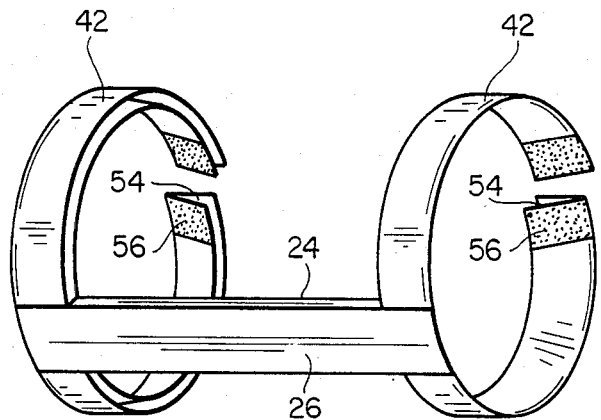
FIG_6

CLOSURE ASSEMBLY AND METHOD OF USING IT

This application is a continuation of application Ser. No. 308,886, filed Oct. 5, 1981 and now abandoned.

DESCRIPTION

This invention relates to an assembly for enclosing a substrate, particularly, though not exclusively, a splice between pressurised telecommunications cables.

It is known to enclose a telecommunications cable splice within a recoverable wraparound sleeve of cross-linked polymeric material, and to provide a closure arrangement therefore of the so-called rail and channel type. This is described for example in our British Patent Specification No. 1155470, the disclosure of which is incorporated herein by reference. In such a closure arrangement, the wraparound sleeve has two upstanding rails that are secured together in abutment by for example, a stainless steel channel. One of the rails may be located at a longitudinal edge of the sleeve whilst the other rail may be spaced from the opposing edge so as to provide a longitudinal integral flap that extends beneath the rails to provide a seal between them.

It is important to ensure that the flap is properly sealed against the inside of the overlapping portion of the sleeve. This is even more important in a further form of wraparound sleeve where, instead of being formed integrally therewith, the flap is provided as a discrete sealing member.

The flap is provided in order to maintain a seal between the two rails, particularly where the splice case is pressurised. The channel does of course provide the necessary clamping force to hold the rails together whilst the sleeve is recovered and any sealant present caused to melt and flow. When installation is complete the sealant in conjunction with the flap provides a barrier to pressure within the splice case and increases the leak path. In order for the flap to do its job properly it must be in tight contact with the sleeve at the base of the two rails, and thereby bridge the two rails. This tight contact can be ensured by the tension in the outer sleeve that results from its shrinkage when the outer sleeve shrinks it causes the flap to be squeezed between the base of the rails and a rigid internal support member which will generally be provided around the wire splices themselves.

A disadvantage of this is that it requries tension to be generated, by heat-shrinkage or otherwise, along the whole length of the closure. In a telecommunication cable splice case tension will generally be necessary at the ends of the case where it meets the ingoing cables in order to produce a good seal to the cables, but in some circumstances shrinkage could conveniently be omitted from the central region of the splice case. If such shrinkage could be omitted it would allow more flexibility in the design of the sleeve, and would reduce installation time and costs. We have solved this problem by providing an urging means within the splice case to force the flap or other sealing means against the base of the rails, so that the tension in the sleeve is not necessary. The present invention can therefore provide an assembly including a wraparound sleeve, that ensures or facilitates a good seal between a sealing member and the closure of the sleeve.

Another important feature in telecommunication splice cases is re-enterability: it is useful to be able to open a splice case for repair or addition of new lines and to reclose it without disturbing the seals between the ends of the old case and the ingoing cables. In one embodiment of the invention, we provide a caged support which allows excellent re-enterability.

In accordance with one aspect of the present invention, there is provided an assembly for enclosing a substrate, comprising a wraparound sleeve having two longitudinal edge regions which can be brought together around the substrate; closure means which can hold together said edge regions to form a closure for the wraparound sleeve; a sealing member which can be arranged inside the sleeve extending at least longitudinally beneath and bridging said edge regions when they are brought together; and means situated radially inwardly of the sealing member for urging the sealing member outwardly against the sleeve to form a seal between said edge regions.

The closure means is preferably a closure member, such as a rail, situated adjacent each edge region; the two rails being held together by a channel to hold the sleeve in a wrapped around configuration. In such case, the sealing member would bridge and seal the gap between the rails.

The sealing member may be discrete, i.e. a separate member, from the sleeve, or alternatively it may be a flap attached to or integral with the sleeve.

The means for urging the sealing member and sleeve into contact with one another may be operated pneumatically (e.g. a bladder), mechanically (e.g. a compressible foam) or electrically (e.g. expansion by electrical heating). Where the sleeve is heat-recoverable the heating to effect the recovery may be arranged also to effect said urging. Similarly, the sealing member may carry a hot-melt adhesive, and heating say to 100° C. to activate the adhesive may simultaneously activate the urging means. The adhesive is preferably polyamide or EVA based and capable of adhering to untreated substrates at low temperatures and pressures. As an alternative to a hot-melt, a curing adhesive could be used: one component being applied to the sealing member and one to the sleeve. Preferably the sealing contact is achieved by operation of an expansive device or other means disposed within the sleeve and arranged to urge the sealing member into contact therewith outwardly from the substrate. This can conveniently be effected by expansion (chemically or after prior compression) of foam material (as is preferred) or of a bladder, or by radial expansion of an annular (or tubular) member within the splice case.

The preferred urging means, a polymeric foam strip, will now be further described. There are two primary requirements of the foam: firstly it must be sufficiently springy to urge the sealing member against the base of the rails, and secondly it should have sufficiently good temperature resistance to maintain this springiness up to 100°–110° C., preferably up to 150° C., the precise temperature depending on the activation temperature of any sealant used, and if a heat-recoverable sleeve is used, on its recovery temperature. The thickness, cell-size and material of the foam will be chosen to produce the desired urging force under the conditions that the assembly will be subjected to. A preferred thickness is 7–12 mm, more preferably 10 mm and the width is preferably 40–60 mm more preferably 50 mm. The cells size may be 0.1–0.05 mm, but other sizes will be satisfactory, and both open and closed cell structure can be used. Preferred materials include polyurethane and cross-linked polyethylene. The foam preferably extends between the transitions in diameter of the splice case and does not lie along the ingoing cables; it will thus be slightly shorter than the sealing member under which it lies. The outer sleeve is wrapped around the cable splice or other substrate (over any internal support that may be provided) and its longitudinal edges bought together so that the closure members overlie the sealing member and urging means. The size of the outer sleeve will match that of the cable splice (or internal support) such that the foam strip has to be compressed to bring the longitudinal edges into proper abutment or overlap. The compressed foam strip will thus urge the sealing member away from the cable splice and against the overlying sleeve to produce the desired seal.

Installation of the sleeve can be made easier if a second foam strip is provided in the assembly substantially diametrically opposite the foam urging strip already discussed. The second foam strip could be held in place during installation by a pressure sensitive adhesive bonding it to the cable splice, internal support or to the outer sleeve. Wrapping the sleeve around the cable splice will obviously be easier if the sleeve is oversize or if the foam urging strip is highly compressible, but this clearly leads to a reduced urging force in the installed product. An extra thick foam urging strip will not generally solve the problem since this can lead to assymetric installation, especially at the transitions in size from the splice to the cables. We have found that ease of installation together with sufficient urging force can be achieved by provision of the second strip of foam. The same principles apply to other expansible urging means.

The sleeve is usually coated internally with a sealant, for example an adhesive or mastic, and a corresponding coating may additionally or alternatively be present on the outer surface of the sealing member.

The sealing member may conveniently be provided as a structure integral with the means for urging it into contact with the sleeve. The sealing member and its urging means, whether integral or not, may be mounted on or affixed to a substantially rigid support member which is disposed around the substrate. Such a rigid support may be an essentially tubular metal canister of fixed diameter; it may, for example, be formed from two half shells, the diameter being fixed by interlocking tongues at the overlapping region of the canister.

Alternatively, the support may be a cardboard based liner as disclosed in our UK Patent Publication No. 2059873 (U.S. application Ser. No. 94,815 now U.S. Pat. No. 4,380,686) or a thermoplastics based liner as disclosed in our UK Patent Publication No. 2069773. These and other patent specifications referred to in this specification are incorporated herein by reference.

Another possibility is that the support over which the sealing member lies is not a rigid canister but is a wrapped around foam arrangement. Such an arrangement is useful where the cable splice is not straight but is banana shaped; the overall size of the splice case would be large if a rigid cylindrical canister was used, and we have found that a foamed polymeric material can be wrapped around the cable splice to provide a support for the overlying sleeve. If the thickness and compressibility of this wraparound foam is correctly chosen, it may in some circumstances carry out the urging function of this invention as well as act as a support.

The sealing member is preferably an elongate strip of length substantially equal to that of the sleeve and of width sufficient to extend over the abutment or lap joint between the closure members of the sleeve and to provide a good seal therebetween. The sealing member may be required to seal against ingress of moisture or dirt, or outward leakage of a pressurised atmosphere. The sealing member is preferably a modified cross-linked polyethylene, or may be any material, for example rubber, suitable for forming a seal with the sleeve and that is sufficiently flexible to follow any contouring of the substrate. A suitable polyethylene is one modified with EVA and carbon black, and cross-linked to give it heat stability. Where the sealing member is a strip it is preferably 1-2 mm thick, more preferably 1.5 mm, and 60-90 mm, more preferably 75 mm wide. The width should preferably allow a 10-15 mm overlap each side of the foam urging means. The sealing member should be sufficiently long to extend the whole length of the splice case.

Means may be provided positively to locate the sealing member, and preferably also the urging means, with respect to the sleeve. In particular the locating means may be arranged to prevent relative rotation between the sleeve and the sealing member and the urging means. The locating means may be pins or tabs which extend from the sealing member or urging means between the longitudinal edges of the sleeve, or may be means for attaching the sealing member or urging means to an internal support.

Where the means for urging the sleeve and sealing member into contact with one another operates mechanically, it may be constituted by two or more members within the sleeve interconnected by springs that are compressed on closing together the edges of the sleeve and which thus urge the sealing member outwardly against the sleeve to effect sealing therebetween. One embodiment of such urging means, in tubular form, is illustrated in FIG. 3 of the accompanying drawings and is described below.

The assembly of the present invention may also include V-shaped seals as disclosed in U.S. Pat. No. 4,409,426. These seals, useful in pressurised cable splice cases, are wrapped around the cables at their outlets from the splice case and present closed concave surfaces to pressure within the case in order to prevent peeling of the sleeve from the cables. These seals may be provided integral with or attached to the sealing member or urging means of this invention.

The wraparound sleeve need not be a recoverable, for example heat-recoverable, sleeve, but at least portions thereof are advantageously recoverable. For example, the ends of the sleeve that wrap around cables the splice of which is enclosed by the assembly, may be recoverable. Furthermore, in addition or alternatively, the portion of the sleeve along and adjacent its edges which extends over the sealing member may be recoverable. When only a part of the sleeve is recoverable by heat, the amount of heat that needs to be supplied is obviously reduced and this can reduce installation time and costs.

In accordance with another aspect of the present invention, there is provided a method of enclosing a substrate wherein a wraparound sleeve is closed around the substrate by closure means which hold together longitudinal edge regions of the sleeve, a sealing member (which may be integral with the sleeve) is located internally adjacent the sleeve to extend at least along said edge regions and the sleeve and sealing member are urged together by an urging means situated radially inwardly of the sealing member to effect a seal between said edge regions. The sealing member is preferably, though not essentially, positioned on the substrate before installation of the wraparound sleeve.

An assembly, in accordance with the present invention, and for enclosing a splice between two pressurised telecommunications cables, will now be described, by way of example, with reference to the accompanying drawings, in which:

FIG. 1 is a side elevation of a partially-completed splice;

FIG. 2 is a vertical section along the line 11—11 of FIG. 1, with the sleeve in place, prior to recovery thereof;

FIG. 3 is a perspective view of a tubular urging means around a cable splice;

FIG. 4 is an end view of a tubular urging means, together with a wraparound sleeve;

FIG. 5 is a perspective view of a support canister; and

FIG. 6 is a perspective view of a unitary sealing/urging strip and V-seals.

Referring to FIG. 1, two pressurised telecommunications cables 2 and 4 are spliced together in a suitable manner. The splice region is enclosed by a pair of interconnecting generally cylindrical metal half shells 6 and 8 to provide a substantially rigid enclosure therearound. The ends 10 and 12 of the shells 6 and 8 taper down, preferably by being bifurcated so as to provide a set of fingers extending axially around and along the outer jackets of the cables 2 and 4. The ends 10 and 12 are secured to their respective cables by taping.

Referring to FIGS. 1 and 2, the enclosures thus produced is to be further protected by a wraparound sleeve 14 that will completely enclose the shells 6 and 8 and also overlap at each end on to the jackets of the cables 2 and 4. As can be seen from FIG. 2, the sleeve 14 has two upstanding rail portions 16 that after being brought into abutment may be maintained secured together by a stainless steel channel 18. As seen in FIG. 2, there is no flap or other overlap between the longitudinal edges of the sleeve 14 so that there may exist a leak path for the pressurised air of the cables. Such a leak path is here sealed by means of a rectangular-section elongate strip 20 of cross-linked polyethylene or other suitable material that extends, preferably, along the whole length of the sleeve 14 beneath the rail and channel closure area. The strip 20 is provided on its outer surface with an adhesive or other sealant coating 22 and, to ensure that the strip 20 is urged into contact with the inside of the sleeve 14, it has a strip of foam 24, supporting it on the half shell 6. The foam strip is preferaly 1–1.75 cm, more preferably about 1.5 cm, wide and 0.75–1.2, more preferably about 0.9 cm thick, although optimum sizes will depend on the particular use.

Where the sleeve is not to be recovered the sealing of the strip 20 to the sleeve 14 is enhanced if the thickness of the foam 24 in relation to the diameters of the shell 6 and sleeve 14 is such that the foam 24 becomes compressed when the rails 16 are urged together so as to enable the channel 18 to be slid thereover. Generally however, the sleeve 14 is recoverable along its rail portions 16, at its overlap with the strip 20, over a portion immediately adjacent thereto, and at its ends where they are required to be sealed on to the cables 2 and 4. Upon heating these recoverable parts to effect recovery, the foam 24 can expand thus urging the sealing strip 20 outwards away from the shell 6 and firmly into contact with the sleeve 14. At the same time, the adhesive 22 and any adhesive on the sleeve will melt and flow thereby sealing any gaps extending outwardly along the sleeve 14 between the rails 16.

The sealing strip 20, adhesive 22 and foam 24 may conveniently be provided as a combined sealing/urging strip 26. As seen in FIG. 1, the strip 26 may be mounted on the half shell 6 and is preferably secured thereto as a partially pre-installed assembly. The ends of the strip 26 can be folded back as shown in FIG. 1 whilst the shells 6 and 8 are assembled on to the cables 2 and 4, and can be disposed beneath the rail and channel of the sleeve 14. Conveniently the strip 26 is arranged to lie along, and thus be supported by, fingers of the bifurcated shell ends 10 and 12.

When, as is preferred, the cables 2 and 4 are pressurised, it is desirable that means be provided for introducing pressurised atmosphere through the sleeve 14 and one of the shells 6 and 8. This can conveniently be effected by having an integral valve assembly (not shown) mounted in one or other of the sleeve 14 and shell 6 and extending through a corresponding aperture in the other (not shown). Such interengagement can conveniently be used to centralise the sleeve 14 on the shell 6 such that the rail and channel closure arrangement is centrally located over the sealing strip 26.

It is envisaged that means other than an expandable foam may be employed to ensure that a sealing member such as the strip 20 is urged into contact with a wraparound sleeve in the region of its closure. For example a bladder may be employed that is inflatable by heat required for recovery of the sleeve, or that is otherwise inflatable. Although a tubular support of fixed diameter is preferred, FIGS. 3 and 4 show a tubular canister or member 28 of variable diameter which is urged by its own resilience or by springs 36 to a larger diameter after first being compressed. It is placed around a splice between cables 30, compressed to reduce its diameter, and a wraparound sleeve is placed around it. Its own resilience or that of the springs 36 provide the sealing pressure mentioned above. Various preferred features will now be described. The two longitudinal edges of the tubular member 28 preferably overlap at a region 34 which is at about 90° to the position that the rails of the overlying sleeve will occupy. The tubular member preferably has tapering fingers 32 at its ends to produce a transition for the splice diameter to the cable diameter. These fingers 32 are only shown at one end of the tubular member in FIG. 3, and only around part of its circumference in FIG. 4, for reasons of clarity. The precise shape of these fingers is not critical but we prefer that slits are provided where they meet the main body of the tubular member to avoid sharp creases which may damage the overlying sleeve. Another preferred feature (not shown) is small extensions to the fingers at their distal ends which lie along the cables; tape is wrapped around the cable 30 overlying these extensions to hold the fingers in their proper configuration.

Where the expansive force of the tubular member 28 is provided by springs, they are preferably lengths of spring metal 36 carried in a series of internal semi-cylindrical quides 38 (shown at only one end of the tubular member). The springs 36 may be hooked outwards as shown in FIG. 4 and engage with holes in the tubular member or they may hook inwards and engage with lugs formed on the inside of the tubular member.

In certain circumstances assembly of the splice may be made easier if means are provided to hold the tubular member 28 in a compressed configuration while the wraparound sleeve 14 is installed. Such holding means may be a hot-melt sealant or other means which can be activated from outside the assembled splice.

The primary function of the expandable tubular member 28 is, of course, to urge a sealing member against the base of rails 16 to prevent leakage of pressure between them, and the sealing member is preferably supplied attached to the tubular member. Such an integrated sealing member is shown in FIG. 3 as item 40. It is shown folded back on itself since this is a convenient arrangement for storage prior to use. The sealing members 40 are folded down over the fingers 30 and along the cables as shown by the arrows.

This invention is particularly applicable for splice cases that are to be pressurised, and FIG. 3 shows a further feature which may be incorporated in pressurised splice cases. Integral with the sealing members 40 are V-seals 42 which preferably comprise a double thickness strip of a flexible sheet polymeric material joined along one edge and at each end and coated on at least one outside surface with a hot-melt adhesive. These V-seals 42 are thus simply channels of a plastics or other suitable material which when in use are wrapped around the cables 30 inside the splice case at the region where the sleeve 14 meets the cables. Their function is to present an unbroken concave surface to pressure within the splice case to prevent or reduce peeling of the sleeve 14 away from the cables 30. Such seals are described and claimed in our UK Patent Publication No. 2040106.

FIG. 5 shows a type of canister which may be used as a support for the sealing member and urging means of the invention as well as for the overlying sleeve. This canister is particularly useful for re-enterable sleeves. The canister may be any suitable metal or plastics material but we prefer galvanized steel sheet having a thickness from 0.7–1.2 mm. As can be seen from the drawings, the canister has a cylindrical form, being made from two end rings and four removeable longitudinal bars 44 (preferred thickness 0.8 mm). The bars, which can be of any suitable cross-sectional shape, can be removed (for example during re-entry to the splice) by means of disconnecting means 48, which preferably lie flush with the bars 44 and which preferably can be locked and unlocked without special tools. The overlying sleeve will be supported by the whole cannister, and one of the bars will additionally carry the sealing member and urging means. Alternatively, the bar that carries the sealing member can itself act as the urging means. As before, tapering fingers 32 (preferred material thickness 1 mm) are provided to produce a smooth transition from the splice diameter to the cable diameters. One pair of fingers 32 at each end of the canister has T-shaped extensions 46 which in use will be bent around the cable. A further feature of the illustrated canister is a hole 50 against which will be positioned a valve in the overlying sleeve. Such a valve would be used either for pressurising the system or for measuring pressure.

FIG. 5 also shows dotted lines 52, indicating the positions where an outer sleeve should be cut to re-enter a splice case employing this type of canister. After these cuts are made the central portion of the sleeve is removed together with the corresponding sealing/urging strip. Then, sufficient longitudinal bars 44 are removed to allow work to be carried out on the splice. When the work is completed, the bars are replaced and a new sealing/urging strip is placed along one of the bars 44, together with new v-seals around the end rings of the canister or around the remaining butts of the old sleeve. Although we prefer to use a new full length outer sleeve to increase axial strength, this positioning of the new v-seals allows a shorter repair sleeve to be used since it need only extend along the central wide part of the canister.

The new sealing urging strip and v-seals may be provided as a single part as illustrated in FIG. 6. FIG. 6 shows a unitary sealing/urging strip 26 having a foam backing 24 with patches of a pressure sensitive adhesive for bonding to one of the longitudinal bars 44. The strip 26 is bonded to V-seals 42, which have release foils 54 between their arms and patches of pressure sensitive adhesive 56 at their ends to facilitate installation. The length of each V-seal is preferably about 1.25× the circumference of the canister or old splice case, to allow a small overlap.

We claim:

1. An assembly for enclosing a substrate, comprising:
   a wraparound sleeve having two longitudinal edge regions which can be brought together around the substrate;
   closure means for holding together said edge regions to form a closure for the wraparound sleeve;
   a sealing member arranged inside the sleeve and extending at least partially longitudinally beneath and bridging said edge regions when they are brought together; and
   means situated radially inwardly of the sealing member for urging the sealing member outwardly against the edge regions to form a seal between said edge regions.

2. An assembly according to claim 1, wherein the closure means are closure members, one situated adjacent each edge region, which can be brought together to effect said closure; the sealing member bridging the gap between the closure members when said edge regions are brought together.

3. An assembly according to claim 1, wherein the sleeve and the sealing member are discrete components.

4. An assembly according to claim 1, wherein the means for urging comprises an expansible foam material.

5. An assembly according to claim 4, wherein the means for urging is a foam strip of thickness from 0.75–1.2 cm.

6. An assembly according to claim 4, which additionally comprises a second foam strip, to be placed substantially diametrically opposed to the first mentioned foam strip, between the sleeve and the substrate.

7. An assembly according to claim 1, wherein the sealing member and means for urging are provided integrally with one another.

8. An assembly according to claim 1, wherein the sealing member comprises a strip of polymeric material coated on one major surface thereof with an adhesive, and wherein said means for urging comprises a strip of foam material disposed on the other major surface of the sealing strip.

9. An assembly according to claim 1, additionally comprising a support for said wraparound sleeve.

10. An assembly according to claim 9, which includes a preassembled unit comprising the sealing member, the means for urging and the support.

11. An assembly according to claim 9, wherein the support comprises a generally cylindrical metal canister.

12. An assembly according to claim 11, wherein the support is longitudinally slit and of variable cross-sectional size, being biased to an expanded configuration in order that it may act as said means for urging.

13. An assembly according to claim 9, wherein the support comprises end rings interconnected by longitudinal bars.

14. An assembly according to claim 13, wherein one of said longitudinal bars acts as said urging means.

15. An assembly according to claim 13, in which means are provided for removeably securing the bars to the rings.

16. An assembly according to claim 1, which additionally comprises a V-seal comprising a double thickness strip of a flexible sheet polymeric material joined along one longitudinal edge.

17. An assembly according to claim 16, in which two said V-seals are attached one at each end of said sealing member.

18. An assembly according to claim 1, wherein the wraparound sleeve is recovered along at least part of its length.

19. A method of enclosing a substrate wherein a wraparound sleeve is closed around the substrate by closure means which hold together longitudinal edge regions of the sleeve, a sealing member is located internally adjacent the sleeve to extend at least along said edge regions and the sleeve and sealing member are urged together by an urging means situated radially inwardly of the sealing member to effect a seal between said edge regions.

20. A method according to claim 19, wherein the urging means is compressed by said closure of the sleeve, thereby urging the sealing member and sleeve into contact with one another.

21. A method according to claim 19, wherein an integral strip comprising the urging means and the sealing member is located over the substrate before the sleeve is wrapped therearound.

22. A method according to claim 19, wherein the sleeve is recoverable along at least part of its length, and is recovered by heating.

* * * * *